(12) United States Patent
Feng et al.

(10) Patent No.: US 11,907,800 B2
(45) Date of Patent: *Feb. 20, 2024

(54) MULTI-FUNCTIONAL OPTICAL ILLUMINATORS

(71) Applicant: Hand Held Products, Inc., Charlotte, NC (US)

(72) Inventors: Chen Feng, Snohomish, WA (US); Jie Ren, SuZhou (CN); Yunxin Ouyang, SuZhou (CN)

(73) Assignee: HAND HELD PRODUCTS, INC., Charlotte, NC (US)

( * ) Notice: Subject to any disclaimer, the term of this patent is extended or adjusted under 35 U.S.C. 154(b) by 13 days.

This patent is subject to a terminal disclaimer.

(21) Appl. No.: 17/733,502

(22) Filed: Apr. 29, 2022

(65) Prior Publication Data
US 2022/0327300 A1      Oct. 13, 2022

Related U.S. Application Data

(63) Continuation of application No. 16/614,182, filed as application No. PCT/CN2017/084624 on May 17, 2017, now Pat. No. 11,347,951.

(51) Int. Cl.
    *G06K 7/10*      (2006.01)
(52) U.S. Cl.
    CPC ..... *G06K 7/10742* (2013.01); *G06K 7/10831* (2013.01); *G06K 2207/1011* (2013.01)
(58) Field of Classification Search
    CPC .................. G06K 7/10742; G06K 7/10831
    USPC ................. 235/454, 462.01–462.49
    See application file for complete search history.

(56) References Cited

U.S. PATENT DOCUMENTS

| | | | |
|---|---|---|---|
| 7,296,751 B2 | 11/2007 | Barber et al. | |
| 7,500,614 B2 | 3/2009 | Barber et al. | |
| 7,510,120 B2 | 3/2009 | Reichenbach et al. | |
| 7,871,003 B2 | 1/2011 | Miyazaki et al. | |

(Continued)

FOREIGN PATENT DOCUMENTS

| | | |
|---|---|---|
| CN | 1391680 A | 1/2003 |
| CN | 2669274 Y | 1/2005 |

(Continued)

OTHER PUBLICATIONS

International Search Report of the International Searching Authority for PCT/CN2017/084624 dated Feb. 26, 2018.

(Continued)

*Primary Examiner* — Jamara A Franklin
(74) *Attorney, Agent, or Firm* — Alston & Bird LLP

(57)  ABSTRACT

A single piece light pipe is designed to provide dual-field, multi-color, multi-directional illumination. The light pipe is combined with a single PCB having a plurality of LEDs to create a compact illuminator that can selectively provide dark field and bright field with red, green, blue color, broad spectrum, or combination of any color in horizontal, vertical, diagonal, or combination of any direction. The single piece light pipe is compact in size and light in weight. The non-closed form option not only can further reduce the weight but also can allow arrange opening area clearance for: (1) visual aiming and alignment in application, especially for hand held application; (2) reducing illumination crosstalk to unwanted directions; and for (3) mechanical integration. The improvements allow the illuminator to read direct product marking (DPM) type of barcodes.

15 Claims, 10 Drawing Sheets

(56) References Cited

U.S. PATENT DOCUMENTS

| | | |
|---|---|---|
| 7,874,487 B2 | 1/2011 | Nunnink et al. |
| 8,282,000 B2 | 10/2012 | Gerst et al. |
| 8,768,159 B2 | 7/2014 | Messina et al. |
| 8,864,034 B1 | 10/2014 | Lei et al. |
| 9,405,951 B2 | 8/2016 | Nunnink et al. |
| 2004/0195328 A1 | 10/2004 | Barber et al. |
| 2005/0087601 A1 | 4/2005 | Gerst et al. |
| 2006/0131419 A1 | 6/2006 | Nunnink |
| 2007/0090193 A1 | 4/2007 | Nunnink et al. |
| 2007/0152055 A1 | 7/2007 | Barber et al. |
| 2008/0017717 A1 | 1/2008 | Miyazaki et al. |
| 2011/0080729 A1 | 4/2011 | Nunnink et al. |

FOREIGN PATENT DOCUMENTS

| | | |
|---|---|---|
| CN | 101149784 A | 3/2008 |
| CN | 102419814 A | 4/2012 |
| CN | 103186759 A | 7/2013 |

OTHER PUBLICATIONS

Non-Final Office Action received for U.S. Appl. No. 16/614,182, dated Sep. 27, 2021, 7 pages.

Notice of Allowance received for U.S. Appl. No. 16/614,182, dated Feb. 2, 2022, 8 pages.

DARK FIELD - - - - - ▶
BRIGHT FIELD - - - - - - ▶

MULTI-FUNCTIONAL OPTICAL ILLUMINATORS

CROSS-REFERENCE TO RELATED APPLICATIONS

This application is a continuation of and claims priority to U.S. application Ser. No. 16/614,182, entitled "MULTI-FUNCTIONAL OPTICAL ILLUMINATORS," and filed Nov. 15, 2019, which claims the benefit of PCT Application No. PCT/CN2017/084624, entitled "MULTI-FUNCTIONAL OPTICAL ILLUMINATORS," filed May 17, 2017, the entireties of which are hereby incorporated by reference.

FIELD OF THE INVENTION

The present invention relates to the field of optical illuminators, and more specifically, to improvements in optical illuminators for machine vision cameras and for reading direct product marking (DPM) barcodes.

BACKGROUND

Generally speaking, machine vision cameras and imaging barcode readers require certain specific illumination for difficult objects and barcodes. One difficult application is direct product marking (DPM) type of barcodes with metallic or laminated material that are commonly adopted in the industry.

Specific illumination for these applications can includes dark field and bright field, color and broad spectrum, single and multi-direction. Traditionally, the requirement for specific illumination has been satisfied by customized illumination systems. These conventional approaches suffer complicated structure with bulky optical light guide, diffuser and reflector combining with huge numbers of LEDs with low light efficiency. Diffused bright field illumination also suffers ghost image of the camera opening of the diffuser in the application of polished object imaging.

There is a need to implement a general purpose multi-functional illumination optical assembly to satisfy the requirement previously achieved with customized illumination systems.

SUMMARY

Accordingly, in one aspect, the present invention embraces devices for a multi-functional optical illuminator. A single piece light pipe may be designed to provide dual-field, multi-color, multi-directional illumination. When combined with single PCB with a plurality LEDs, the compact illuminator can selectively provide dark field and bright field with red, green, blue color, broad spectrum, or combination of any color in horizontal, vertical, diagonal, or combination of any direction. The multi-functional optical illuminator may be capable of reading a direct product marking (DPM) type of barcode.

In an exemplary embodiment, an illuminator may comprise a light pipe with an open frame structure for visual aiming of the illuminator to facilitate an alignment of a barcode; and a circuit board, attached to a back opening of the light pipe, comprises six dark field LEDs for generating six dark field illuminations and two bright field LEDs for generating bright field illuminations. The two bright field LEDs may produce two alternating point sources for providing bright field illuminations in different directions to minimize a specular reflection hot spot without using any diffuser during the bright field illuminations. Also, chamfered inner edges of the light pipe emit the dark field illuminations in different orientations from the light pipe.

The illuminator may selectively provide dark field illumination and bright field illumination with a red, green, or blue color, or a combination of any color, and in a horizontal, a vertical, a diagonal, or a combination of directions thereof. The six dark field LEDs may support red, green blue color options to achieve a preferred contrast for different barcode backgrounds and foregrounds due to different materials and surface features. The barcode may be a direct product marking (DPM) type barcodes. A host computer, coupled to the illuminator, may provide programming information to control of the dark field illumination and bright field illumination.

The chamfered inner edges may be textured and may be located on front opening of the light pipe to allow an emission of dark field illuminations in various orientations. The six dark field LEDs may emit dark field illumination through input ports on the back opening of the light pipe, wherein, the input ports may have no coating to minimize a reduction of the dark field illumination. A camera may be mounted on the circuit board, through an opening on the circuit board, with a lens of the camera viewing at the front opening of the light pipe. An exterior surface and an interior surface of the light pipe may be coated sequentially with first a reflective coating and then a non-reflective coating. The light pipe comprises polycarbonate (PMMA) injection molding.

In another exemplary embodiment, a light pipe may comprise a single piece open frame structure; a multi-layer coating on an exterior and an interior of the light pipe; and a front opening with chamfered light output ports to provide illumination uniformity with an optimized chamfer angle and chamfer surface texture to support emissions of dark field illuminations in various orientations. The light pipe also may comprise LED input ports located on a rear of the light pipe that have no coating in order to minimize a reduction of illumination from the LEDs.

The multi-layer coating may comprise coating (i) coating a reflective layer to substantially achieve total internal reflection for high efficiency in dark field illumination, and then (ii) coating a non-reflective layer to minimize any light reflection in light field application. When integrated into an illuminator, the single piece open frame structure supports visual aiming of the illuminator to facilitate an alignment of an object.

Light pipe total internal reflection may suffer leakage from the geometry details of the light pipe and may not completely satisfy the total internal reflection requirement. Light pipe surface defects may also break the total internal reflection condition. Adding reflective coating can effectively "substantially" reflect this leaking light back into the pipe.

Light pipe without coating or with reflective coating may be highly reflective to the outside light. This situation may create a problem for bright field application. When the bright field point source light is on, reflection of the surrounding light pipe may generate reflection and create ghost images. Non-reflective coating can "minimize" the reflection to outside light and can make bright field illumination well controlled.

In yet another exemplary embodiment, a multi-function illuminator may comprise a plurality of bright field LEDs for generating bright field illumination; a plurality of dark field LEDs for generating dark field illumination; a circuit board comprising the plurality of bright field LEDs and plurality of dark field LEDs; a light pipe attached to the circuit board to transfer dual-field, multi-color, multi-directional illumination; a controller for selectively controlling the plurality of bright field LEDs and plurality of dark field LEDs; and a camera mounted on the circuit board, through an opening on the circuit board, with a lens of camera viewing at the front opening of the light pipe.

The plurality of bright field LEDs and plurality of dark field LEDs may generate the dark field illumination and bright field illumination with a red, green, or blue color, or a combination of any color, and in a horizontal, a vertical, a diagonal, or a combination of directions thereof. The plurality of bright field LEDs may comprise two bright field LEDs and plurality of dark field LEDs may comprise 6 dark field LEDs. The two bright field LEDs may provide two alternating point sources for generating two consecutive images that are combined to provide a hot spot free image with specular reflection minimized. A front opening of the light pipe may comprise chamfered light output ports at the front opening of the light pipe to provide illumination uniformity with optimized chamfer angle and chamfer surface texture to support emissions of dark field illuminations in various orientations. The dark field LEDs may emit the dark field illumination through input ports on a back opening of the light pipe, wherein, the input ports have no coating.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 8 illustrates another exemplary embodiment of the dark field and bright field illumination in a multi-functional illuminator.

DETAILED DESCRIPTION

Figure 1:
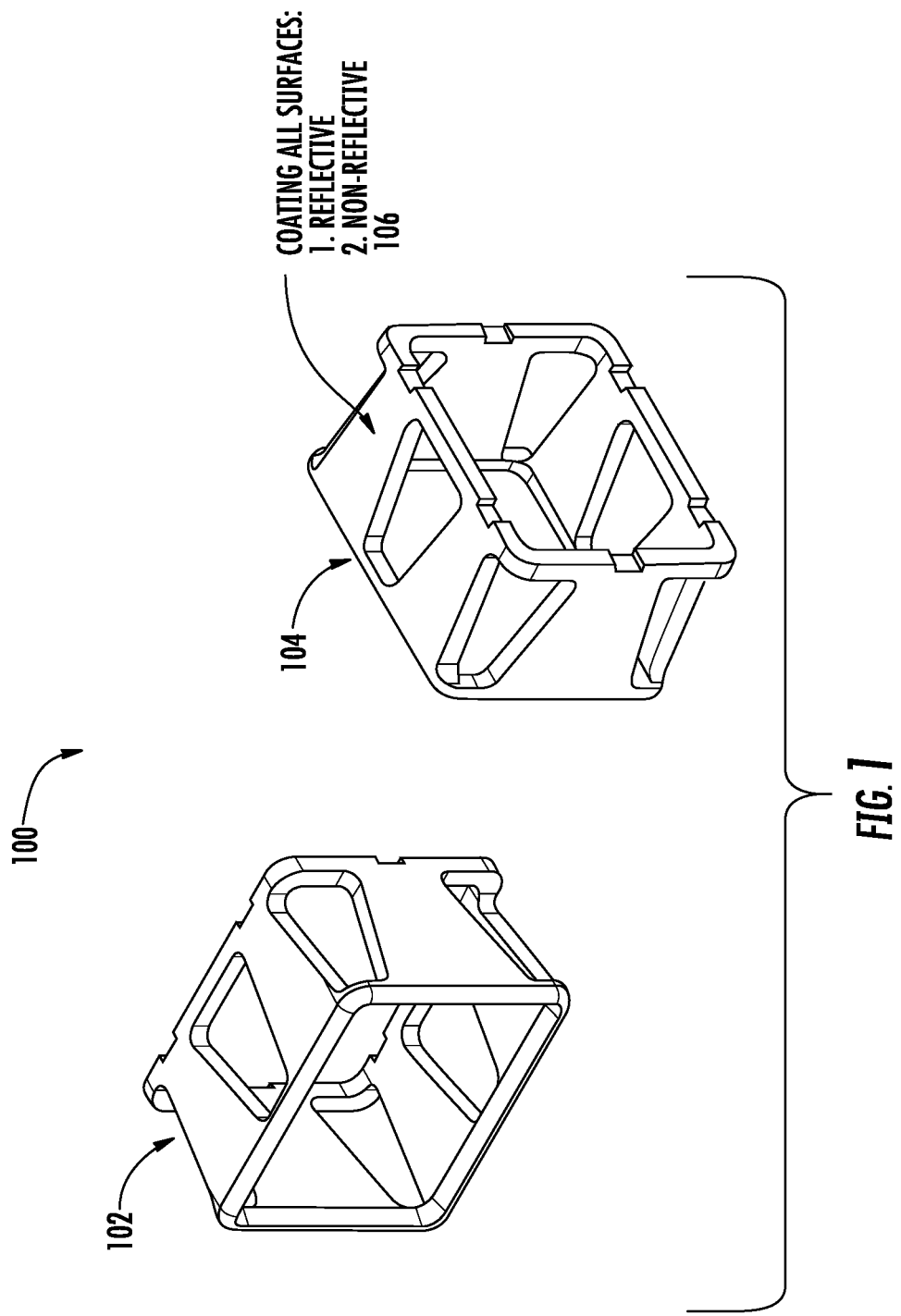
FIG. 1 illustrates an exemplary embodiment of a single piece illuminator light pipe.

Accordingly, in one aspect, the present invention embraces a new single piece multi-functional integrated illuminator with a compact size and a minimum amount of LEDs that may provide adequate illumination. The illuminator may control LEDs selectively for dark and bright field illumination. Previously solutions required complicated multi-piece optical assembly. The alternative spot bright field illumination solves the hot spot problem of polished object imaging. The selectable illumination allows for efficient reading of complex barcodes, e.g. DPM barcodes.

A barcode reader (or barcode scanner) can be an electronic device that can read and output the data of a printed barcodes to a computer. It can include of a light source, a lens and a light sensor translating optical impulses into electrical pulses. Barcode readers can contain decoder circuitry that analyzes the barcode's image data provided by the sensor and sends the barcode's content to the scanner's output port.

DPM barcode scanners and mobile computers are equipped with imagers capable of reading barcodes that are etched or imprinted directly into the surface of materials such as plastic and metal.

DPM tags are in essence Datamatrix (or QR) symbols directly marked onto a substrate (metal, rubber, glass, etc.). There are many marking technologies to choose from (e.g. mechanical drilling/hammering/laser etching/chemical etching/sand-blasting/mold casting/stenciling etc.) depending on substrate type, cost, and the level of durability that can be desired. Unlike paper-based barcodes (i.e. printed on plain paper and usually printed with black ink/thermal on white backgrounds) DPM barcodes can be tricky to scan, for several reasons including reflectance from the substrate and lack of contrast between the actual marks and the said substrate. Often times these marks can even appear completely "washed-out" to the casual observer. Another peculiarity of DPM barcodes is that the barcode can be made of an assortment of dots which can be clearly non-contiguous with each other, or be overlapped to some degree; these marks are usually referred to as "dot-peen" when made of recessed circular dots.

A single piece light pipe may be designed to provide dual-field, multi-color, multi-directional illumination. Combined with single PCB with 8 LEDs, the compact illuminator can selectively provide dark field and bright field with red, green, blue narrow color, broad spectrum, or combination of any color in horizontal, vertical, diagonal, or combination of any direction. There may be applications with only bright field illumination, or only dark field illumination.

The single piece light pipe may be compact in size and light in weight. The non-closed form option not only can further reduce the weight but also can allow an opening area clearance for: (1) visual aiming and alignment in application, especially for hand held application; (2) reducing illumination crosstalk to unwanted directions; and for (3) mechanical integration.

The unique light-pipe design may comprises a multi-layer coating to achieve: (1) stopping light leaking from inside of the pipe to improve the efficiency of the dark field illumination; and (2) preventing reflection of the bright field illumination to reduce unwanted illumination, which can cause ghost image when imaging smooth reflective object. The multi-layer coating can include an initial coat of reflective coating and a second coat of non-reflective coating.

The light-pipe clear opening with chamfered light output port can provide illumination uniformity with optimized chamfer angle and chamfer surface texture. The optimized chamfer angle is designed to minimize the loss of dark field illumination when the light passes through the chamfered light output ports. The non-closed light pipe with a non-reflective exterior allows alternating dual point sources bright illumination. Commonly used in the industry is light field illumination with closed form light diffuser to provide diffused illumination to reduce possibility of specular reflection created hot spot in image. This solution can create difficulties for object imaging and barcode decoding, especially for highly reflective polished surface, metallic surface or laminated surface, such as DPM barcodes. The missing part of diffuser at the opening for camera can create dark ghost image. The present invention can solve the specular reflection problem by using two alternating point sources with minimum size hot spot. Combining two consecutive images can minimize specular reflection without need of closed form bright field illumination. Minimizing the specular reflection prevents the illumination of the hot spots from damaging the imaging.

FIG. 1 illustrates an exemplary embodiment of single piece illuminator light pipe 100, herein after "light pipe 100". FIG. 1 includes two views of light pipe 100; view 102 shows the front of light pipe 100 and view 104 shows the rear of light pipe 100. The exterior and interior surfaces 106 of light pipe 100 include a dual coating. First, exterior and interior surfaces 106 are coated with a reflective coating. Second, exterior and interior surfaces 106 are coated with a non-reflective coating. Hence, all surfaces are coated with a multi-layer coating on the exterior and the interior of the light pipe 100.

Figure 2:
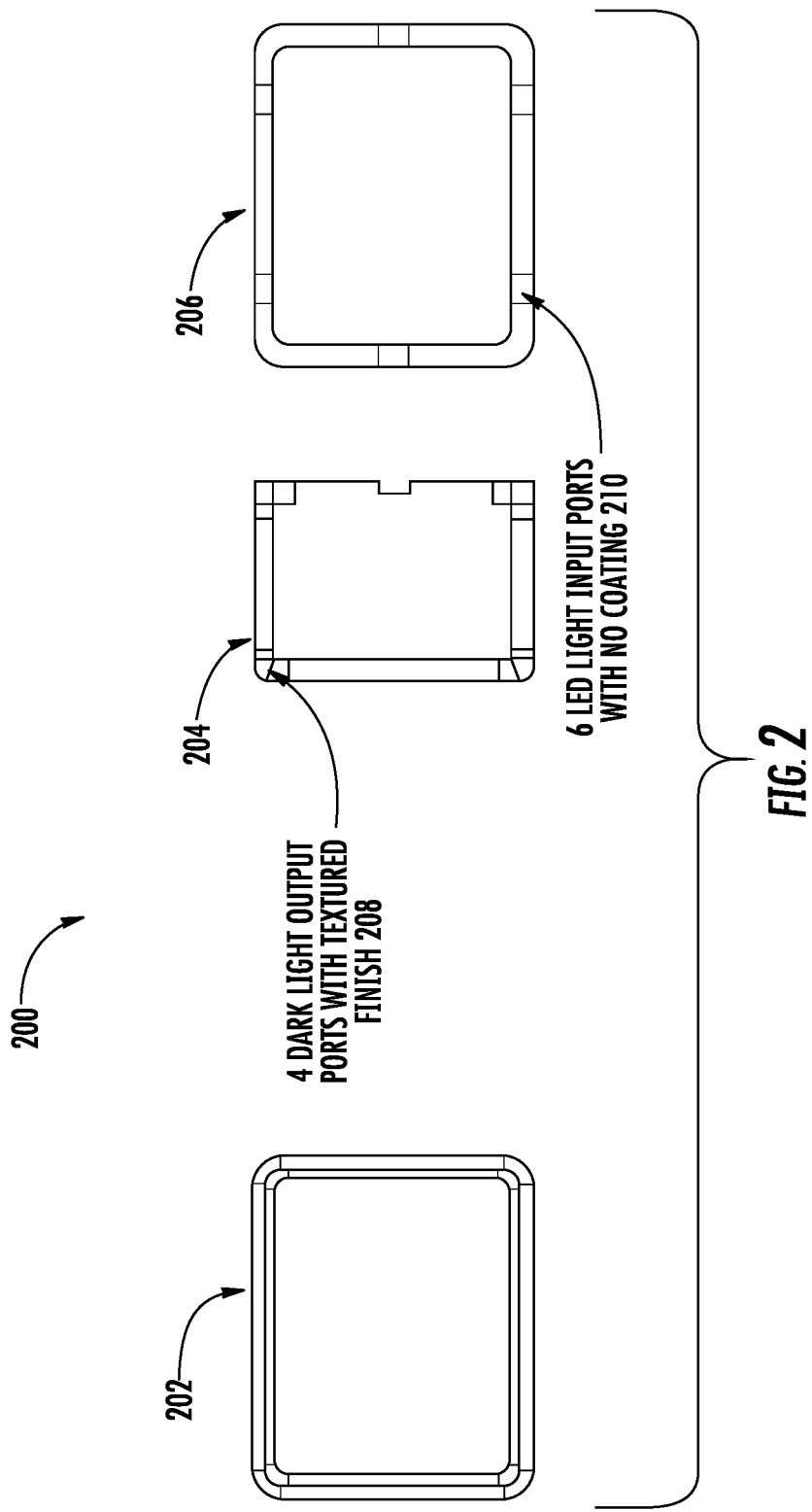
FIG. 2 illustrates another exemplary embodiment of a single piece illuminator light pipe.

FIG. 2 illustrate illustrates exemplary embodiment of single piece illuminator light pipe 200, herein after "light pipe 200". View 202 illustrates the front of light pipe 200. View 204 illustrates a cross section view of light pipe 200, including its edges that have an opening to allow light to exit from light pipe 200. The dark field light output port 208 has a chamfer shape and a textured finish. The dark field light output port 208 is located at the front opening of light pipe 200. View 206 illustrated the rear of light pipe 200 including a LED light input port 210. The light input port 210 has no reflective coating so as to minimize a reduction of the illumination from the LEDs as the light travels through the LED light input port 210. There are five other areas for light input ports similar to light input port 210 on the rear side of light pipe 200.

Figure 3:
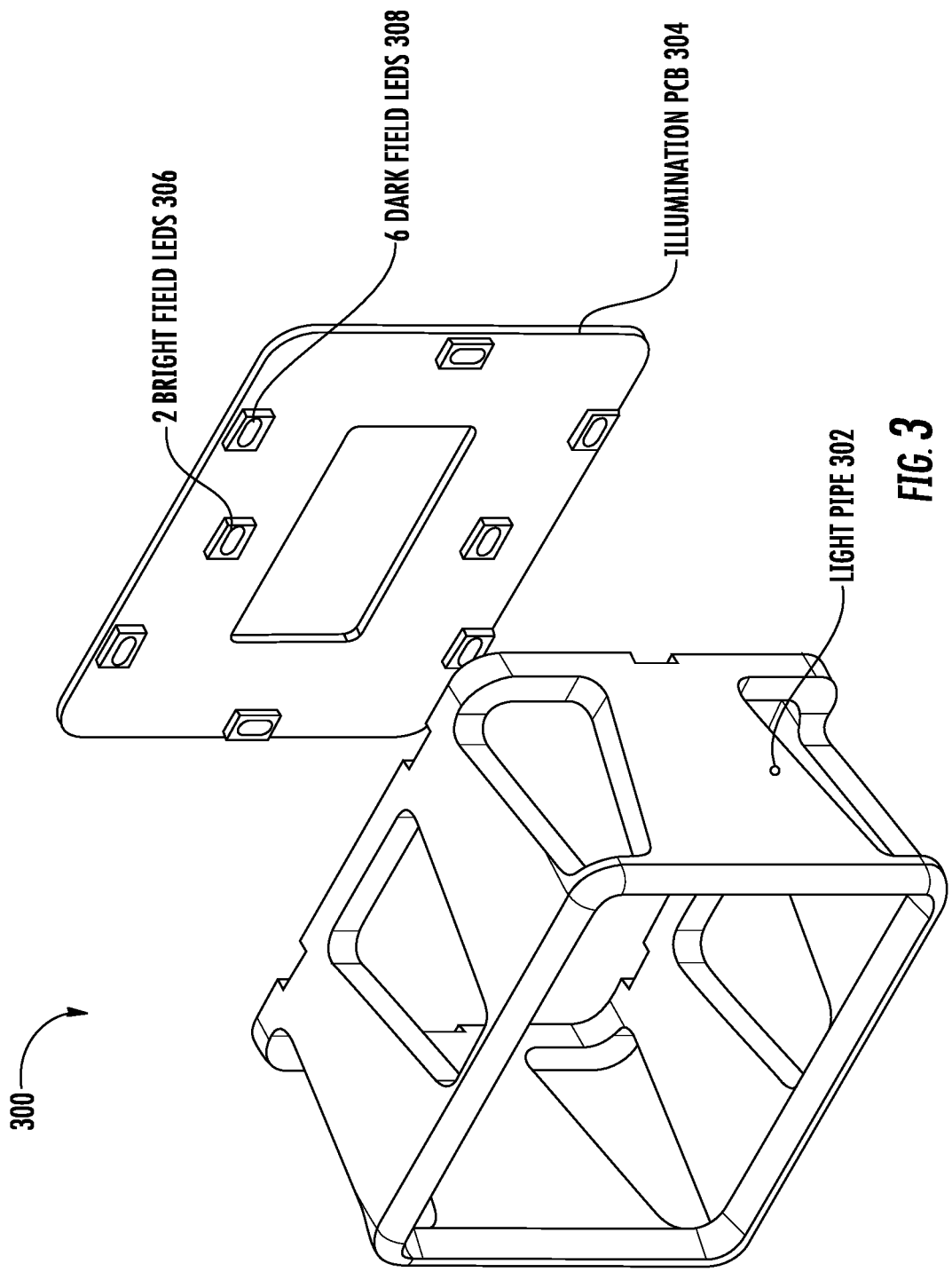
FIG. 3 illustrates an exemplary embodiment of a single piece illuminator light pipe and a printed circuit board (PCB) comprising eight LEDs.

FIG. 3 illustrates an exemplary embodiment of single piece illuminator light pipe assembly 300, including and an illumination printed circuit board (PCB) 304 and a single piece light pipe 302. Illumination PCB 304 comprising eight LEDs. The LEDs include two bright field LEDs 306 and six dark field LEDs 308. The six dark field LEDs 308 are positioned on the illumination PCB 304 to align with the 6 LED light input ports, per FIG. 2. The two bright field LEDs 306 are positioned on a vertical axis in the center of illumination PCB 304, with one LED positioned in the upper part of the illumination PCB 304, and the other LED positioned in the lower part of the illumination PCB 304. Illumination PCB 304 has a rectangular shaped hole which supports the insertion of camera assembly 406.

Figure 4:
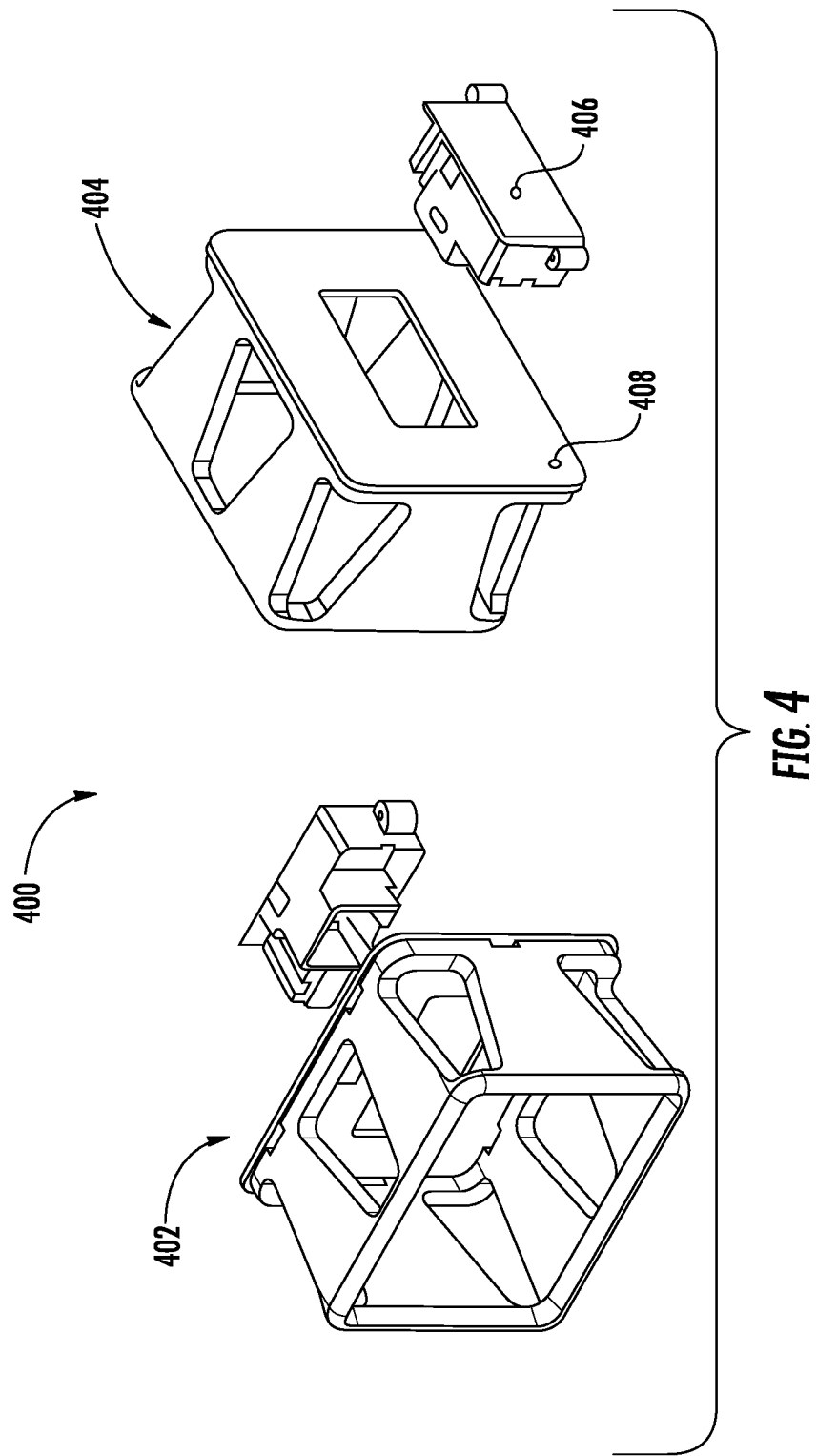
FIG. 4 illustrates an exemplary embodiment of a multi-functional illuminator.

FIG. 4 illustrates an exemplary embodiment of a multi-functional illuminator with a camera 400. View 402 presents a front view of multi-functional illuminator with a camera 400, and View 404 presents a rear view of multi-functional illuminator with a camera 400, including illumination assembly 408 and camera assembly 406.

Figure 5:
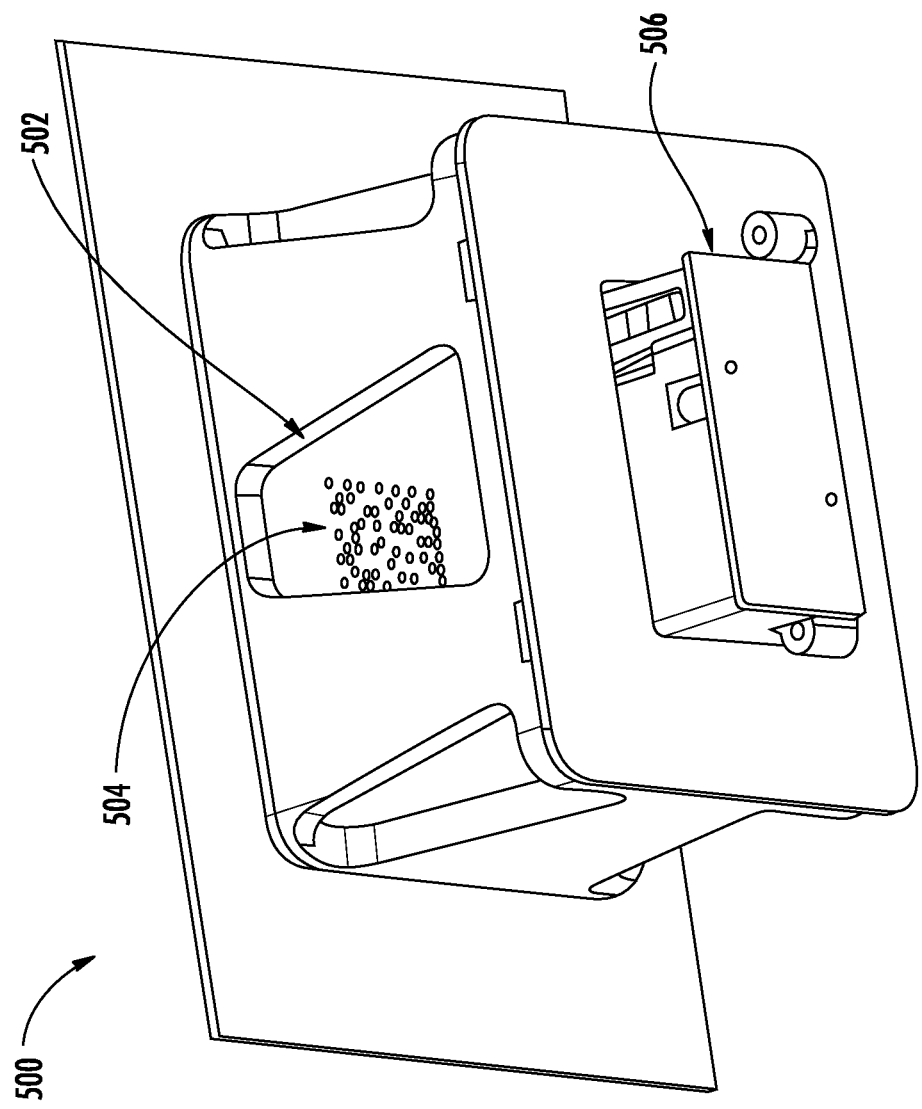
FIG. 5 illustrates an exemplary embodiment of the viewing and alignment of barcodes with a multi-functional illuminator.

FIG. 5 illustrates an exemplary embodiment of the viewing and alignment of barcodes with a multi-functional illuminator 500. Single piece illuminator light pipe assembly has an opening 502 in the top of its structure that allows a user to view a barcode and properly align the barcode in multi-functional illuminator 500. View 504 illustrates the view of the barcode. Camera assembly 406 of FIG. 4 has been assembled into multi-functional illuminator 500, as indicated by camera assembly 506. FIG. 5 illustrates the application of DPM barcodes with dark field illumination.

Figure 6:
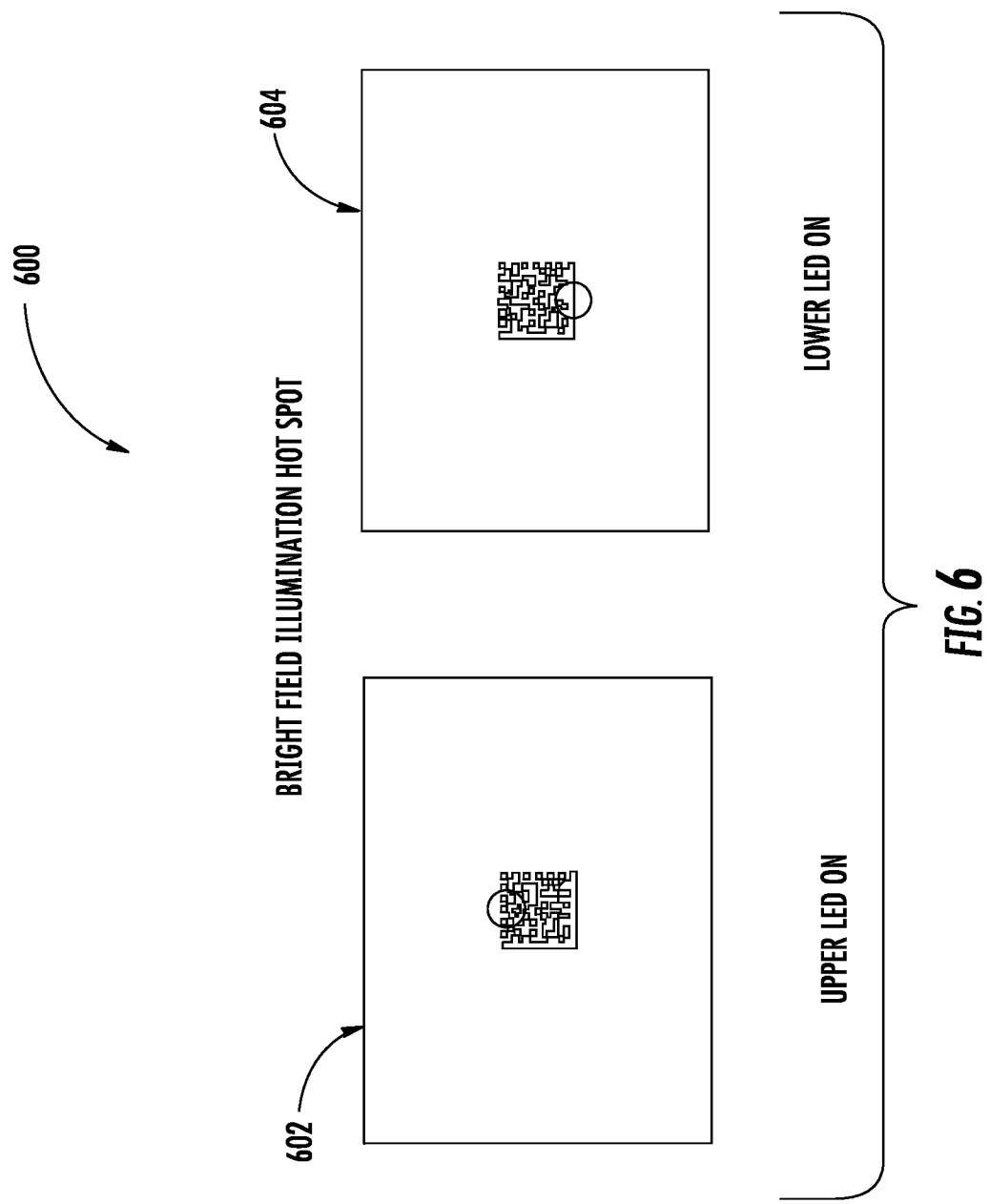
FIG. 6 illustrates an exemplary embodiment of bright field illumination hot spot images.

FIG. 6 illustrates an exemplary embodiment of bright field illumination hot spot images 600. Image 602 illustrates a barcode with the upper LED turned on and image 604 illustrates a barcode with the lower LED turned on. Two consecutive images with different hot spot can combine to form a spot free image.

Figure 7:
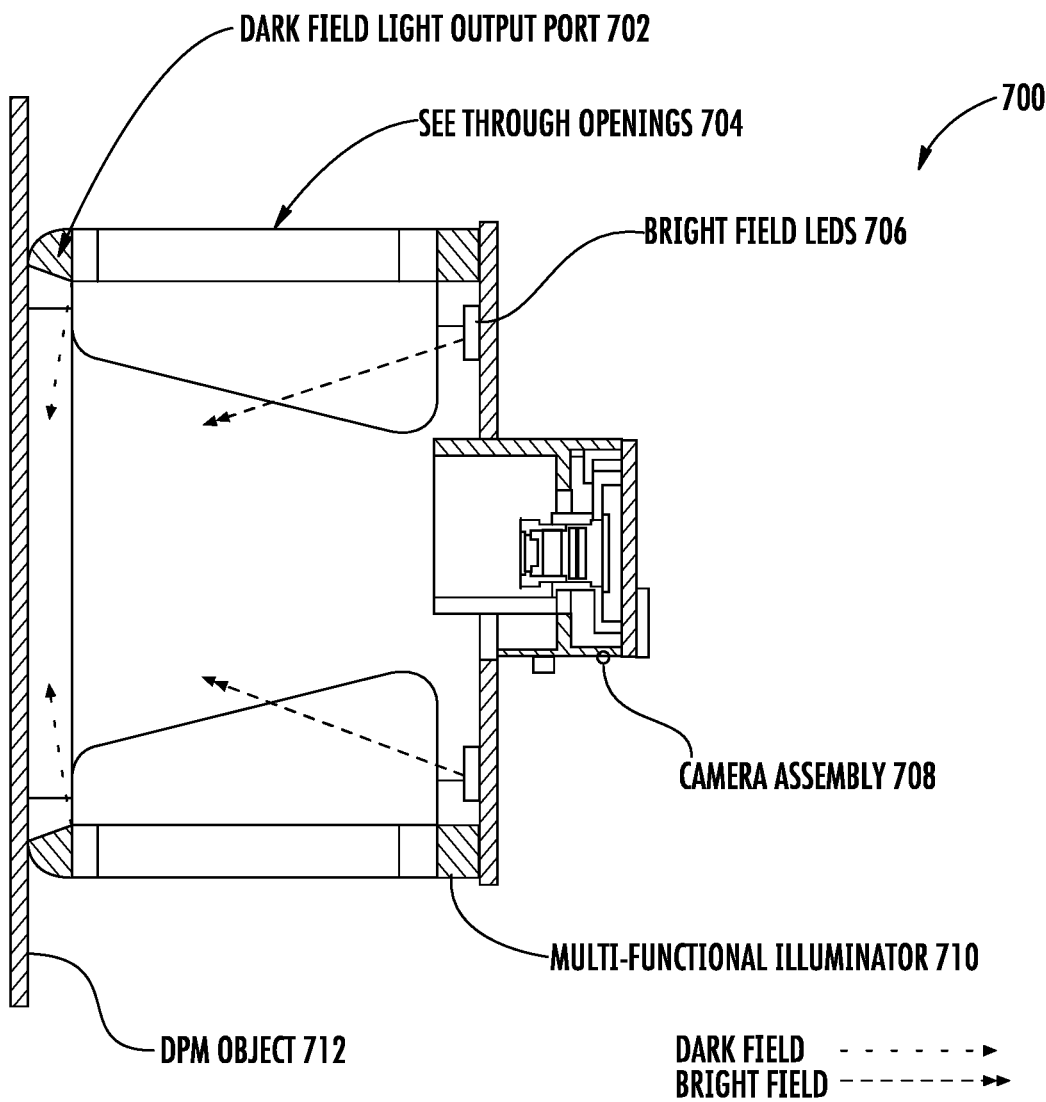
FIG. 7 illustrates an exemplary embodiment of the dark field and bright field illumination in a multi-functional illuminator.
Figure 8:
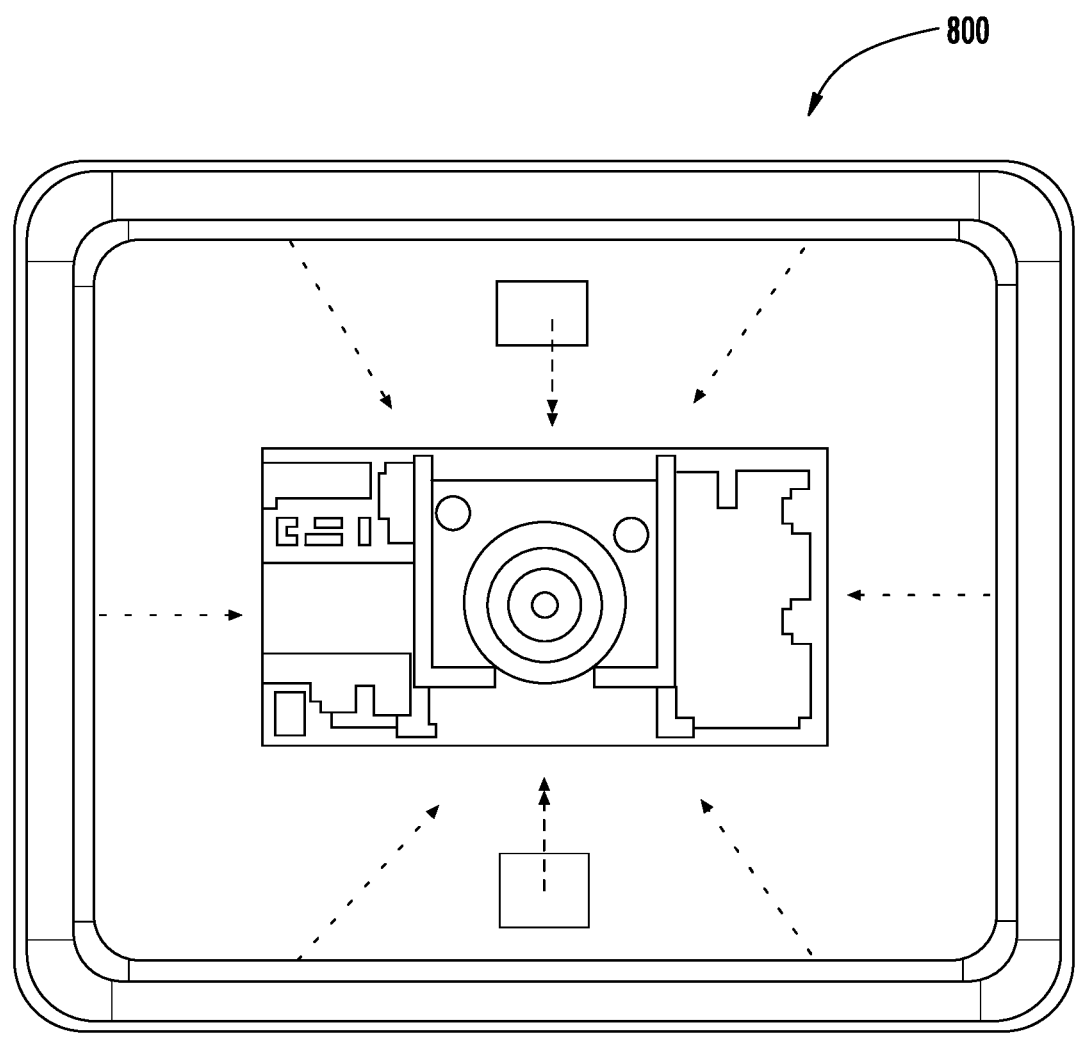
FIG. 8 is the front view of FIG. 7.

FIG. 7 illustrates an exemplary embodiment 700 of the cross section view of a multi-functional illuminator 710, including dark field and bright field illumination. FIG. 7 illustrates the following: i) dark field light output port 702, consistent with dark field light output port 208 of FIG. 2; ii) see through opening 704, consistent with opening 502 of FIG. 5; iii) bright field LEDs 706, consistent with two bright field LEDs 306 of FIG. 3; iv) camera assembly 708, consistent with camera assembly 406 of FIG. 4 and camera assembly 506 of FIG. 5; and v) DPM object 712. FIG. 8 is the front view of FIG. 7. FIG. 7 also illustrates dark field illumination with no or minimal specular reflections into the camera assembly 708, and bright field with 2 alternating point sources for specular reflection hot spot removal without a need for a diffuser.

FIG. 8 illustrates another exemplary embodiment of the dark field and bright field illumination in a multi-functional illuminator 800. FIG. 8 is the front view of FIG. 7. FIG. 8 illustrates dark field illumination with horizontal, vertical (e.g., combining 2 dark field illuminations on the same edge, and diagonal illuminations. FIG. 8 also illustrates bright field illuminations.

Figure 9:
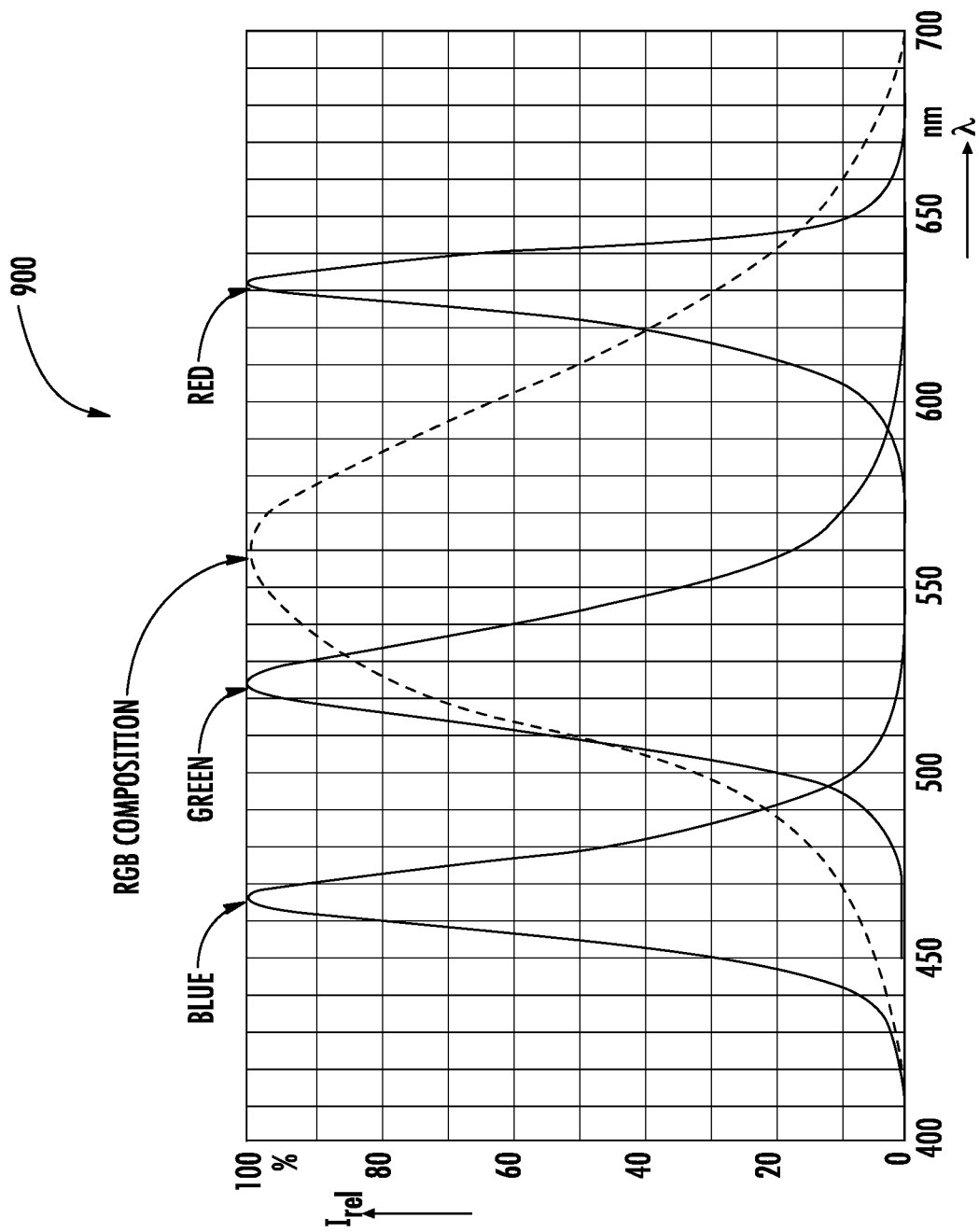
FIG. 9 illustrates an exemplary embodiment of the RED-Green-Blue (RGB) spectrum of the LEDs of a multi-functional illuminator.

FIG. 9 illustrates an exemplary embodiment of the RED-Green-Blue (RGB) spectrum 900 of the LEDs of a multi-functional illuminator 710. FIG. 9 illustrates the three primary colors and combination of the three primary color options.

Figure 10:
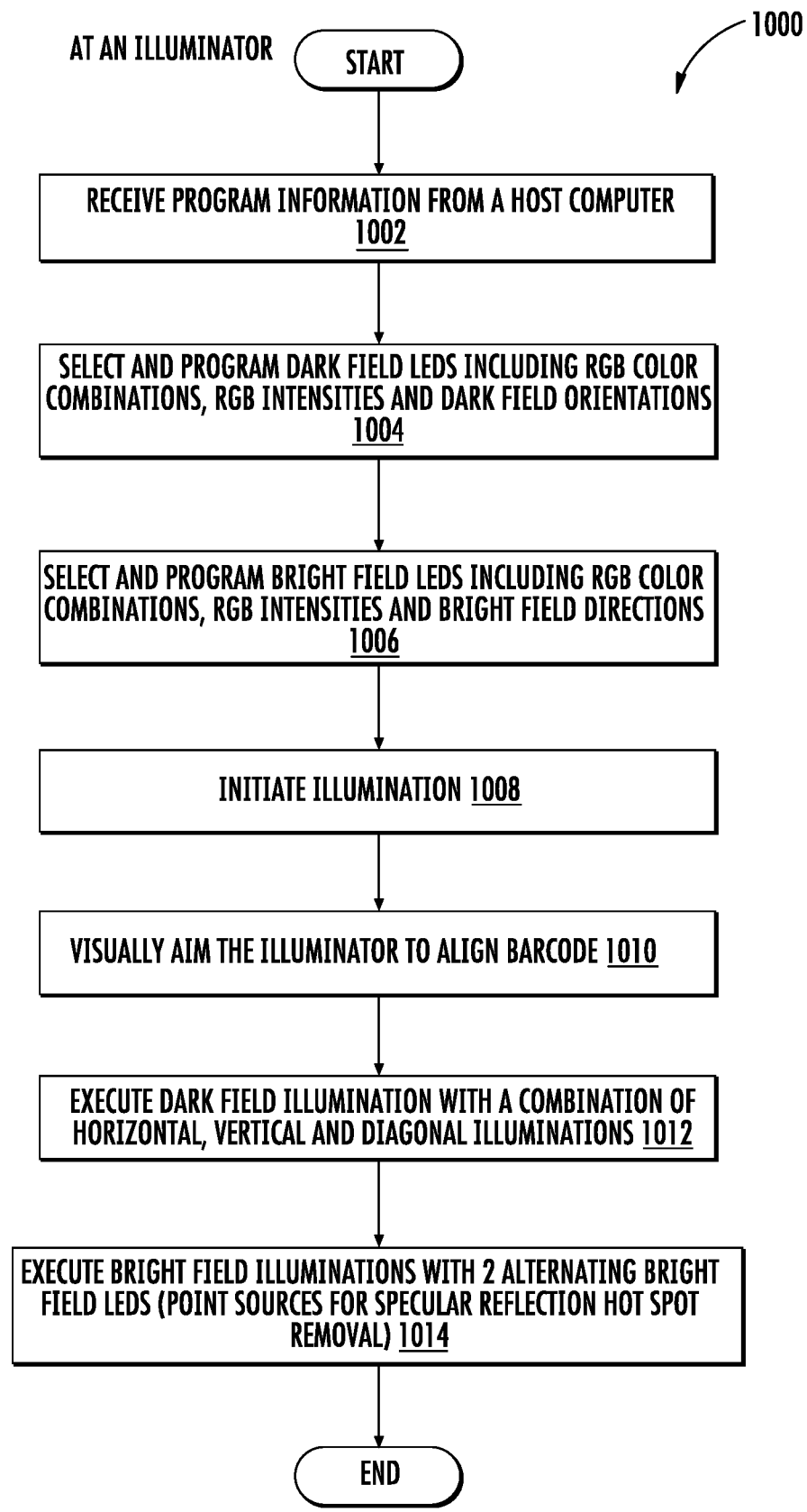
FIG. 10 illustrates an exemplary embodiment of a flowchart describing the operation of a multi-functional illuminator.

FIG. 10 illustrates an exemplary embodiment of a flowchart 1000 describing the operation of an illuminator, such as multi-functional illuminator 710. The illuminator executes the following steps:

Receiving program information from a host computer. (step 1002); selecting and programming dark field LEDs including RGB color combinations, RGB intensities and dark field orientations. (step 1004);

Selecting and programming bright field LEDs including RGB color combinations, RGB intensities and bright field directions. (step 1006);

Initiating illumination. (step 1008) The illuminator may start with preferred setting, such as one side dark field of one bright field. Based on the image captured and trial decode status, further adjusting may occur causing a selection of a different field and/or a different direction;

Visually aiming the illuminator to align barcode. (step 1010);

Executing dark field illumination with a combination of horizontal, vertical and diagonal illuminations. (step 1012) There may be only dark field applications, such as highly reflective surface with only surface profile change or texture change markings. Also, there may be bright field only applications, such as very low contrast marking and/or on highly absorbing surface; and Executing bright field illuminations with 2 alternating bright field LEDS (point sources for specular reflection hot spot removal. (step 1014). It may be sufficient to achieve hot spot cancellation with 2 alternating bright field LEDs.

In the specification and/or figures, typical embodiments of the invention have been disclosed. The present invention is

The invention claimed is:

1. An illuminator, comprising:
   a light pipe with an open frame structure for visual aiming of the illuminator to facilitate an alignment of a barcode, wherein chamfered inner edges of the light pipe are textured and are located on a front opening of the light pipe to allow an emission of dark field illuminations in different orientations;
   a circuit board, attached to a back opening of the light pipe, comprising at least one of one or more dark field LEDs for generating dark field illuminations and one or more bright field LEDs for generating bright field illuminations, wherein a camera is mounted on the circuit board, through an opening on the circuit board, with a lens of the camera, viewing at a front opening of the light pipe; and
   wherein, the one or more bright field LEDs produce one or more alternating point sources for providing bright field illuminations in different directions to minimize a specular reflection hot spot without using any diffuser during the bright field illuminations.

2. The illuminator as in claim 1, wherein, the illuminator provides at least one of the dark field illuminations and the bright field illuminations with a red, green, or blue color, or a combination thereof, and in a horizontal, a vertical, a diagonal, or a combination of directions thereof.

3. The illuminator as in claim 2, wherein, the one or more dark field LEDs support red, green, and blue color options to achieve a preferred contrast for different barcode backgrounds and foregrounds due to different materials and surface features.

4. The illuminator as in claim 2, wherein, a host computer, coupled to the illuminator, provides programming information to control at least one of the dark field illuminations and the bright field illuminations.

5. The illuminator as in claim 1, wherein, the barcode is a direct product marking (DPM) type barcode.

6. The illuminator as in claim 1, wherein, the one or more dark field LEDs emit the dark field illuminations through input ports on the back opening of the light pipe, wherein, the input ports have no coating to minimize a reduction of the dark field illuminations.

7. The illuminator as in claim 1, wherein, the light pipe comprises a polycarbonate (PMMA) injection molding.

8. A light pipe, comprising:
   a single piece open frame structure; and
   a front opening with chamfered light output ports to provide illumination uniformity with an optimized chamfer angle and chamfer surface texture to support emissions of dark field illuminations in various orientations,
   wherein, the single piece open frame structure is integrated into an illuminator and supports visual aiming of the illuminator to facilitate an alignment of an object.

9. The light pipe as in claim 8, comprising:
   LED input ports located on a rear of the light pipe with no coating in order to minimize a reduction of illumination from a plurality of LEDs.

10. The light pipe as in claim 8, wherein, the object is a barcode, and wherein, the open frame structure supports visual aiming of the illuminator to facilitate an alignment of the barcode.

11. A multi-function illuminator, comprising:
    at least one of a plurality of bright field LEDs for generating bright field illumination and a plurality of dark field LEDs for generating dark field illumination;
    a circuit board comprising at least one of the plurality of bright field LEDs and the plurality of dark field LEDs;
    a light pipe, with an open frame structure, attached to the circuit board to transfer dual- field, multi-color, multi-directional illumination, wherein a front opening of the light pipe comprises chamfered light output ports at the front opening of the light pipe to provide illumination uniformity with optimized chamfer angle and chamfer surface texture to support emission of the dark field illumination in various orientations;
    a controller for controlling at least one of the plurality of bright field LEDs and the plurality of dark field LEDs; and
    a camera mounted on the circuit board, through an opening on the circuit board, with a lens of the camera, viewing at a front opening of the light pipe.

12. The multi-function illuminator in claim 11, wherein, at least one of the plurality of bright field LEDs and the plurality of dark field LEDs generate at least one of the dark field illumination and the bright field illumination with a red, green, or blue color, or a combination thereof, and in a horizontal, a vertical, a diagonal, or a combination of directions thereof.

13. The multi-function illuminator in claim 11, wherein, the plurality of bright field LEDs comprise one or more bright field LEDs and the plurality of dark field LEDs comprise one or more dark field LEDs.

14. The multi-function illuminator in claim 13, wherein, the one or more bright field LEDs provide alternating point sources for generating one or more consecutive images that are combined to provide a hot spot free image with specular reflection minimized.

15. The multi-function illuminator in claim 11, wherein, the plurality of dark field LEDs emit the dark field illumination through input ports on a back opening of the light pipe, and wherein, the input ports have no coating.

* * * * *